United States Patent
Chen

(10) Patent No.: US 11,518,712 B2
(45) Date of Patent: Dec. 6, 2022

(54) ENVIRONMENT-FRIENDLY ARTIFICIAL STONE WITH LOW COST AND HIGH STRENGTH AND A PREPARATION METHOD THEREOF

(71) Applicant: Jinpan Chen, Guangdong (CN)

(72) Inventor: Jinpan Chen, Guangdong (CN)

(73) Assignee: Guangdong Zhirong New Material Technology Co., Ltd., Guangdong (CN)

( * ) Notice: Subject to any disclaimer, the term of this patent is extended or adjusted under 35 U.S.C. 154(b) by 879 days.

(21) Appl. No.: 16/404,760

(22) Filed: May 7, 2019

(65) Prior Publication Data
US 2020/0299188 A1    Sep. 24, 2020

(30) Foreign Application Priority Data
Mar. 21, 2019   (CN) .......................... 201910215176.1

(51) Int. Cl.
| | | |
|---|---|---|
| *C04B 14/06* | (2006.01) | |
| *C04B 14/22* | (2006.01) | |
| *C04B 18/12* | (2006.01) | |
| *C04B 24/42* | (2006.01) | |
| *C04B 26/18* | (2006.01) | |
| *C04B 40/00* | (2006.01) | |
| *C04B 111/54* | (2006.01) | |
| *C04B 103/54* | (2006.01) | |
| *C04B 111/00* | (2006.01) | |
| *C04B 111/82* | (2006.01) | |

(52) U.S. Cl.
CPC .............. *C04B 14/06* (2013.01); *C04B 14/22* (2013.01); *C04B 18/12* (2013.01); *C04B 24/42* (2013.01); *C04B 26/18* (2013.01); *C04B 40/0042* (2013.01); *C04B 40/0046* (2013.01); *C04B 40/0067* (2013.01); *C04B 40/0089* (2013.01); *C04B 2103/54* (2013.01); *C04B 2111/00017* (2013.01); *C04B 2111/542* (2013.01); *C04B 2111/82* (2013.01); *C04B 2201/50* (2013.01)

(58) Field of Classification Search
CPC ......... C04B 14/06; C04B 14/22; C04B 18/12; C04B 20/0076; C04B 24/42; C04B 26/18; C04B 40/0042; C04B 40/0046; C04B 40/0067; C04B 40/0082; C04B 40/0089; C04B 40/0263; C04B 2103/54; C04B 2111/00017; C04B 2111/00215; C04B 2111/542; C04B 2111/82; C04B 2201/50
See application file for complete search history.

(56) References Cited

U.S. PATENT DOCUMENTS

2020/0102247 A1* 4/2020 Zhang ....................... B28B 1/16
2020/0115281 A1* 4/2020 Li ............................ C04B 14/22

FOREIGN PATENT DOCUMENTS

CN          109369068 A  *   2/2019    ............. C04B 26/18

* cited by examiner

*Primary Examiner* — Anthony J Green

(57) ABSTRACT

The invention relates to an environment-friendly artificial stone with low cost and high strength and a preparation method thereof, the artificial stone comprises the following raw materials in parts by mass: 60-80 parts of fritted sand; 10-30 parts of quartz powder; 9-14 parts of terephthalic unsaturated polyester resin; 0.6-1 parts of curing agent; 0.8-1 parts of coupling agent; 0.5-1 parts of pigment paste; 0.1-1 parts of pigment powder. The invention has advantages of: (1) using mine solid waste or waste materials as raw materials, and using blast-furnace gas and coke-oven gas recovered and purified in the productive process of the steel plant and coking plant as fuel, the production process is green and environment-friendly, which can recycle waste materials. (2) high strength, natural stripe, elegance appearance, green and environmental protection, and being recognized by global customers and promising in worldwide market.

5 Claims, No Drawings

ENVIRONMENT-FRIENDLY ARTIFICIAL STONE WITH LOW COST AND HIGH STRENGTH AND A PREPARATION METHOD THEREOF

BACKGROUND OF THE INVENTION

1. Field of the Invention

The invention relates to the field of artificial construction materials, and particularly relates to an environment-friendly artificial stone with low cost and high strength and a preparation method thereof.

2. Background Art

With the advancement of the society, the progress of the economy, and the rapid development of all walks of life, we can see that the damage to the environment is getting more and more serious, and more and more people are realizing that part of the current economic development is at the expense of environmental damage. The damage to the environment is not only a large amount of predatory use of various resources, but also the random discard of used waste. As for the environmental problems are increasingly prominent, people are more and more aware of the importance of the environmental protection.

Coal gangue is a solid waste discharged during the coal mining and washing process, is a kind of black-gray rock with low carbon content and harder than coal, associated with coal seams during coal formation, and the main components thereof are $Al_2O_3$ and $SiO_2$, it has been accumulated about 10 million tons in China over the years and continues to discharge about 1 million tons per year, which are not only accumulated to occupy the land, but also may be spontaneous combustion to pollute the air or cause fires. Coal gangue is mainly used for the production of coal gangue cement, concrete lightweight aggregates, refractory bricks and other construction materials, moreover, it can also be used for recovering coal which may be fired together with gangue to produce electricity, used for producing chemical products such as crystalline aluminum chloride and water glass, extracting precious rare metals, and can also be used as fertilizer, however, it is still far from being able to consume excessive gangue inventory. In recent years, China has introduced a series of preferential policies to reduce income tax and added-value tax for the comprehensive utilization of coal gangue. These policies demonstrate the state's emphasis on and support for the comprehensive utilization of resources. In conjunction with the reform of fiscal taxation, finance and pricing systems, local governments should also actively study and formulate incentives for fiscal, taxation, and price promotion for the comprehensive utilization of coal gangue. If the blast-furnace gas of iron and steel plant and the industrial waste gas with low-combustion from the coking plant and other manufacturing enterprises are used as the energy source, and the waste tailing quartz and coal gangue can be quenched by calcination water to form an environmentally-friendly fritted sand material with high hardness which is bound to have a huge market demand, and also to be a green environmental protection industry.

Artificial quartz slate is a new type of composite material, which is made by mixing unsaturated polyester resin with high-quality quartz sand, filler and pigment, adding a small amount of initiator, and processing through a certain manufacturing procedure. In the manufacturing process, different pigments can be used to make products with bright colors and jade-like luster like natural marble. The artificial quartz slate is gradually becoming decoration and construction market newly favors in the recent years for the advantages of no toxicity, non-radioactive, flame retardant, non-stick oil, non-soiling, anti-bacteria, abrasion resistant, impact resistant, easy maintenance, seamless splicing arbitrarily shapes and etc. Artificial slate can also be combined with a variety of materials and processing methods to create a unique design effect. However, the resin used in artificial quartz stone is synthesized by components of petroleum cracking, and the petroleum resources are limited; moreover, all the adopted high-quality quartz sands are selected, and the remaining more than 90% of the quartz sand with impurities are mostly abandoned, which causes great damage to the ecological environment.

For the concept of "green", conventional materials can be divided into two categories: one is the material that pollutes the environment because of its nature, which should be responded to abandonment attitude, and what we should do is to vigorously develop new materials that can be regenerated green; the second is the material that pollutes the environment for the production process, we should improve the production process thereof and explore green and sustainable production mode. Therefore, it is necessary to use new materials and methods to produce new green artificial stone, which can replace conventional artificial quartz stone.

SUMMARY OF THE INVENTION

In order to solve the defects and disadvantages of the prior art, the invention aims at providing an environment-friendly artificial stone with low cost and high strength and a preparation method thereof.

The object of the invention is realized by the following technical schemes:

an environment-friendly artificial stone with low cost and high strength, comprising the following raw materials in parts by mass:

| | |
|---|---|
| fritted sand | 60-80 parts |
| quartz powder | 10-30 parts |
| terephthalic unsaturated polyester resin | 9-14 parts |
| curing agent | 0.6-1 parts |
| coupling agent | 0.8-1 parts |
| pigment paste | 0.5-1 parts |
| pigment powder | 0.1-1 parts; | wherein, the fritted sand comprises the following components as mass percent:

| | |
|---|---|
| $Al_2O_3$ | 1-10% |
| $SiO_2$ | 60-80% |
| $Fe_2O_3$ | 0.1-0.5% |
| CaO | 5-10% |
| MgO | 2-5% |
| $K_2O$ | 0.2-4% |
| $Na_2O$ | 5-15% |
| $TiO_2$ | 0.1-2%. |

Preferably, the quartz powder may be tailing quartz, the terephthalic unsaturated polyester resin may be terephthalic unsaturated polyester resin synthesized by chemical degradation and regeneration of waste plastic bottles.

Preferably, a flexural strength of the environment-friendly artificial stone with low cost and high strength is 80-115 Mpa.

Preferably, the fritted sand comprises the fritted sand of 8-16 mesh, 16-26 mesh, 26-40 mesh, 40-70 mesh, 70-120 mesh and/or 120-200 mesh.

Preferably, the fritted sand is obtained by melting tailing quartz, coal gangue, limestone, sodium feldspar and potassium feldspar in a mass ratio of 7-10:4-6:1-2:1-3:1-3 at a high temperature of 1200° C.-1400° C., and then quenching in chilled water.

Preferably, mesh range of the quartz powder is 300-1000 mesh.

Preferably, the curing agent is tert-Butylperoxy-2-ethylhecanoate.

Preferably, the coupling agent is γ-methacryloxy propyl trimethoxyl silane.

Preferably, the pigment paste is at least one of titanium white paste, iron yellow paste, carbon black paste, scarle paste and phthalo blue paste.

Preferably, the pigment powder is at least one of titanium white powder, iron red powder, iron yellow powder, iron black powder, phthalo blue powder, metal powder and carbon black powder.

A preparation method of an environment-friendly artificial stone with low cost and high strength, comprising the following steps:

(1) a premixture was prepared by mixing 0.6-1 parts of curing agent, 0.8-1 parts of coupling agent, 0.5-1 parts of pigment paste and 9-14 parts of terephthalic unsaturated polyester resin; and fritted sand is obtained by melting tailing quartz, coal gangue, limestone, sodium feldspar and potassium feldspar in a mass ratio of 7-10:4-6:1-2:1-3:1-3 at a high temperature of 1200° C.-1400° C., and then quenching in chilled water;

(2) stirring and mixing the premixture obtained in step (1), 60-80 parts of the fritted sand, and 10-30 parts of quartz powder;

(3) adding the product obtained in step (2) on a mould plate, and spraying 0.1-1 parts of pigment powder according to certain lines and designs;

(4) vibrating the product obtained in step (3) and press forming under vacuum, and curing molding by heating the product for 90-150 minutes at 75-90° C.;

(5) after demoulding from the embryonic plate, conserving, keeping thickness and polishing, the environment-friendly artificial stone with low cost and high strength is obtained.

Preferably, the stirring and mixing in step (2) are performed in the following steps: stirring for 10 minutes according to the steps of rotating at a low frequency of 10 Hz for 2 minutes, reversing at a low frequency of 10 Hz for 2 minutes, rotating at a high frequency of 50 Hz for 3 minutes, and stirring at a high frequency of 50 Hz for 3 minutes; the vibrating and press forming in step (3) are performed as vibrating and press forming by eight frequency bands in sequence: 30 seconds at 25 Hz, 30 seconds at 30 Hz, 30 seconds at 35 Hz, 30 seconds at 40 Hz, 30 seconds at 45 Hz, 30 seconds at 50 Hz.

Preferably, the 1200° C.-1400° C. high temperature melting uses blast-furnace gas and/or coke-oven gas recovered and purified in the productive process of the steel plant and coking plant as the fuel.

Preferably, the curing agent is tert-Butylperoxy-2-ethylhecanoate; the coupling agent is γ-methacryloxy propyl trimethoxyl silane; the pigment paste is at least one of titanium white paste, iron yellow paste, carbon black paste, scarle paste and phthalo blue paste; the pigment powder is at least one of titanium white powder, iron red powder, iron yellow powder, iron black powder, phthalo blue powder, metal powder and carbon black powder.

Compared to the prior art, the invention has the following advantageous effects:

The fritted sand of the invention has the advantages of less impurities, uniform particle size, high hardness, good light transmittance and smooth surface without air holes, and the used materials are all regenerated and recycled waste materials which are environmental-friendly.

The terephthalic unsaturated polyester resin used in the invention may be terephthalic unsaturated polyester resin synthesized by chemical degradation and regeneration of waste plastic bottles, which can make full use of waste plastics; the adopted quartz powder in the invention may be tailings quartz powder, with economic benefits of green environmental protection.

The quartz powder is used for filling clearance between spherical fritted sand, which forms a high-density structure by mutually meshing, and is easy to increase the filling density in the vibrating process and to reduce the usage of resin; the terephthalic unsaturated polyester resin is used for cross-linking and curing bonding, and the prepared artificial glass composite plate has the advantages of high hardness, high density, abrasion resistant, etc., and has better polishing glossiness and light transmittance, as well as non-soiling, environment protection, no toxicity, non-radioactive.

The source of tailing quartz sand and coal gangue of terephthalic unsaturated polyester resin, quartz powder and synthesized fritted sand are rich, which can recycle waste material, in line with the environmental recycling requirements of the green ecological civilization construction and waste recycling advocated by China state, which makes the earth cleaner.

The production of the invention may add different pigments, be large-scale production, and may be produced according to the requirements of customers, which is convenient for decoration and matching, creating high-end colorful living space.

The production of the invention has high flexural strength, and the range of flexural strength is 80-115 MPa, which has great improvement compared with the conventional quartz stone of 50-70 MPa flexural strength, moreover, for the stronger hardness than conventional o-benzene quartz stone, the terephthalic resin has better performance in falling ball impact strength, antifouling property and ageing-resistant performance.

DETAILED DESCRIPTION OF THE PREFERRED EMBODIMENTS

The invention will be further described in detail below with reference to the embodiments, but the embodiments of the invention are not limited thereto.

Embodiment 1

An environment-friendly artificial stone with low cost and high strength, the consumption of each raw material (parts by mass) is:

| | |
|---|---|
| fritted sand of 26-40 mesh | 35 parts |
| fritted sand of 40-70 mesh | 30 parts |
| tailing quartz powder | 20 parts |
| terephthalic unsaturated polyester resin | 12.0 parts |
| tert-Butylperoxy-2-ethylhecanoate | 1.0 part |
| γ-methacryloxy propyl trimethoxyl silane | 1.0 part |

-continued

| | |
|---|---|
| composite pigment paste | 0.5 parts |
| composite pigment powder | 0.5 parts | wherein, the fritted sand comprises following chemical components:

| | |
|---|---|
| $Al_2O_3$ | 2.8% |
| $SiO_2$ | 71.7% |
| $Fe_2O_3$ | 0.1% |
| CaO | 7.5% |
| MgO | 3.5% |
| $K_2O$ | 0.8% |
| $Na_2O$ | 13.5% |
| $TiO_2$ | 0.1% | the tailing quartz powder is quartz powder of 350 mesh;

The composite pigment paste is a mixture of titanium white paste, scarle paste and iron yellow paste in a ratio of (mass fraction) of 7:1:2.

The composite pigment powder is a mixture of titanium white powder, iron red powder and phthalo blue powder in a ratio of (mass fraction) of 6:1:1.

In the embodiment, a preparation method of an environment-friendly artificial stone with low cost and high strength, comprising the following steps:

(1) a premixture was prepared by mixing tert-Butylperoxy-2-ethylhecanoate, γ-methacryloxy propyl trimethoxyl silane, composite pigment paste and terephthalic unsaturated polyester resin; and fritted sand of 26-40 mesh and that of 40-70 mesh are obtained by melting tailing quartz sand, coal gangue, limestone, sodium feldspar and potassium feldspar in a mass ratio of 8:5:1:2:1 at a high temperature of 1350° C. in the rotary frit furnace by using blast-furnace gas and coke-oven gas recovered and purified in the productive process of the steel plant and coking plant as the fuel, and then quenching in chilled water.

(2) stirring and mixing the fritted sand, the tailing quartz sand and the premixture for 10 minutes according to the steps of rotating at a low frequency of 10 Hz for 2 minutes, reversing at a low frequency of 10 Hz for 2 minutes, rotating at a high frequency of 50 Hz for 3 minutes, and stirring at a high frequency of 50 Hz for 3 minutes for 10 minutes;

(3) adding the mixture in step (2) on a mould plate and spraying composite pigment powder;

(4) putting the product obtained in step (3) into a pressing machine, vacuumizing, vibrating and forming at eight frequency bands in sequence: 30 seconds at 25 Hz, 30 seconds at 30 Hz, 30 seconds at 35 Hz, 30 seconds at 40 Hz, 30 seconds at 45 Hz, 30 seconds at 50 Hz, and then putting the pressed plate into curing oven and flatwise sizing for 24 hours after 85° C. curing for 120 minutes;

(5) after keeping thickness by putting the abovementioned embryonic plate into polishing machine and fine polishing by 26-6000 mesh abrasion block, the environment-friendly artificial stone with low cost and high strength is obtained.

The raw materials and steps remain the same to prepare a conventional artificial quartz sand composite plate, except that using 26-70 mesh quartz sand instead of the fritted sand.

The obtained environment-friendly artificial stone with low cost and high strength and conventional artificial quartz sand composite plate are tested for mechanics performance, wherein three test results of the flexural strength of the conventional artificial quartz sand composite plate are 60.3 MPa, 60.5 MPa and 60.6 MPa respectively, and the average value was 60.5 MPa; three test results of the flexural strength of the new artificial stone with high performance and low cost synthesized by the environment-friendly materials are 107 MPa, 105 MPa and 106 MPa respectively, and the average value was 106 MPa, which is improved about 75% comparing with the flexural strength of the conventional artificial quartz sand composite plate; In addition, three falling ball impact strength tests are carried out on the environmentally-friendly artificial stone with low cost and high strength, and the results are 135 cm, 137 cm and 136 cm respectively, and the average value was 136 cm.

Embodiment 2

An environment-friendly artificial stone with low cost and high strength, comprising the following raw materials in parts by mass:

| | |
|---|---|
| fritted sand of 40-70 mesh | 50 parts |
| fritted sand of 70-120 mesh | 24 parts |
| tailing quartz powder | 11 parts |
| terephthalic unsaturated polyester resin | 12.5 parts |
| tert-Butylperoxy-2-ethylhecanoate | 0.8 parts |
| γ-methacryloxy propyl trimethoxyl silane | 0.7 parts |
| composite pigment paste | 0.6 parts |
| composite pigment powder | 0.4 parts | wherein, the fritted sand comprises following chemical components:

| | |
|---|---|
| $Al_2O_3$ | 1.8% |
| $SiO_2$ | 73.5% |
| $Fe_2O_3$ | 0.15% |
| CaO | 7.8% |
| MgO | 3.8% |
| $K_2O$ | 1.2% |
| $Na_2O$ | 11.5% |
| $TiO_2$ | 0.2% | the tailing quartz powder is quartz powder of 450 mesh;

The composite pigment paste is a mixture of titanium white paste, carbon black paste and iron yellow paste in a ratio of (mass fraction) of 6:3:2.

The composite pigment powder is a mixture of titanium white powder, iron black powder and iron yellow powder, in a ratio of (mass fraction) of 5:2:1.

In the embodiment, a preparation method of an environment-friendly artificial stone with low cost and high strength, comprising the following steps:

(1) a premixture was prepared by mixing tert-Butylperoxy-2-ethylhecanoate, γ-methacryloxy propyl trimethoxyl silane, composite pigment paste and terephthalic unsaturated polyester resin; and fritted sand of 40-70 mesh and that of 70-120 mesh are obtained by melting tailing quartz sand, coal gangue, limestone, sodium feldspar and potassium feldspar in a mass ratio of 9:4:1:1:1 at a high temperature of 1400° C. in the rotary frit furnace by using blast-furnace gas and coke-oven gas recovered and purified in the productive process of the steel plant and coking plant as the fuel, and then quenching in chilled water.

(2) stirring and mixing the fritted sand, the tailing quartz sand and the premixture for 10 minutes according to the steps of rotating at a low frequency of 10 Hz for 2 minutes, reversing at a low frequency of 10 Hz for 2 minutes, rotating at a high frequency of 50 Hz for 3 minutes, and stirring at a high frequency of 50 Hz for 3 minutes for 10 minutes;

(3) adding the mixture in step (2) on a mould plate and spraying composite pigment powder;

(4) putting the product obtained in step (3) into a pressing machine, vacuumizing, vibrating and forming at eight frequency bands in sequence: 30 seconds at 25 Hz, 30 seconds at 30 Hz, 30 seconds at 35 Hz, 30 seconds at 40 Hz, 30 seconds at 45 Hz, 30 seconds at 50 Hz, and then putting the pressed plate into curing oven and flatwise sizing for 24 hours after 90° C. curing for 110 minutes;

(5) after keeping thickness by putting the abovementioned embryonic plate into polishing machine and fine polishing by 26-6000 mesh abrasion block, the environment-friendly artificial stone with low cost and high strength is obtained.

The raw materials and steps remain the same to prepare a conventional artificial quartz sand composite plate, except that using 26-70 mesh quartz sand instead of the fritted sand.

The obtained environment-friendly artificial stone with low cost and high strength and conventional artificial quartz sand composite plate are tested for mechanics performance, wherein three test results of the flexural strength of the conventional artificial quartz sand composite plate are 60.3 MPa, 60.5 MPa and 60.6 MPa respectively, and the average value was 60.5 MPa, three test results of the flexural strength test of the new artificial stone with high performance and low cost synthesized by the environment-friendly materials are 110 MPa, 112 MPa and 113 MPa respectively, and the average value was 111 MPa, which is improved about 82% comparing with the flexural strength of the conventional artificial quartz sand composite plate; In addition, three falling ball impact strength tests are carried out on the new artificial stone with high performance and low cost synthesized by the environment-friendly materials, and the results are 137 cm, 139 cm, and 138 cm respectively, and the average value was 138 cm.

Embodiment 3

An environment-friendly artificial stone with low cost and high strength, the consumption of each raw material (parts by mass) is:

| | |
|---|---|
| fritted sand of 8-16 mesh | 8 parts |
| fritted sand of 16-26 mesh | 15 parts |
| fritted sand of 26-40 mesh | 18 parts |
| fritted sand of 40-70 mesh | 30 parts |
| tailing quartz powder | 16 parts |
| terephthalic unsaturated polyester resin | 11.0 parts |
| tert-Butylperoxy-2-ethylhecanoate | 0.7 parts |
| γ-methacryloxy propyl trimethoxyl silane | 0.6 parts |
| composite pigment paste | 0.5 parts |
| composite pigment powder | 0.2 parts | wherein, the fritted sand comprises following chemical components:

| | |
|---|---|
| $Al_2O_3$ | 4.8% |
| $SiO_2$ | 68.0% |
| $Fe_2O_3$ | 0.1% |
| CaO | 8.6% |
| MgO | 3.7% |
| $K_2O$ | 1.0% |
| $Na_2O$ | 13.5% |
| $TiO_2$ | 0.3% |

The fritted sand is fritted particles of 8-16 mesh, 16-26 mesh, 26-40 mesh and 40-70 mesh which are obtained by melting tailing quartz sand, coal gangue, limestone, sodium feldspar and potassium feldspar in a mass ratio of 9:3:1:1:2 at a high temperature of 1380° C. in the rotary frit furnace by using blast-furnace gas and coke-oven gas recovered and purified in the productive process of the steel plant and coking plant as the fuel, and then quenching in chilled water.

the tailing quartz powder is quartz powder of 500 mesh;

The composite pigment paste is a mixture of titanium white paste, scarle paste and iron black paste in a ratio of (mass fraction) of 9:3:1.

The composite pigment powder is a mixture of titanium white powder, iron black powder and metal powder, in a ratio of (mass fraction) of 5:1:2.

In the embodiment, a preparation method of an environment-friendly artificial stone with low cost and high strength, comprising the following steps:

(1) a premixture was prepared by mixing tert-Butylperoxy-2-ethylhecanoate, γ-methacryloxy propyl trimethoxyl silane, composite pigment paste and terephthalic unsaturated polyester resin; and fritted sand of 8-16 mesh, 16-26 mesh, 26-40 mesh and 40-70 mesh are obtained by melting tailing quartz sand, coal gangue, limestone, sodium feldspar and potassium feldspar in a mass ratio of 9:3:1:1:2 at a high temperature of 1380° C., and then quenching in chilled water.

(2) stirring and mixing the fritted sand, the tailing quartz sand and the premixture for 10 minutes according to the steps of rotating at a low frequency of 10 Hz for 2 minutes, reversing at a low frequency of 10 Hz for 2 minutes, rotating at a high frequency of 50 Hz for 3 minutes, and stirring at a high frequency of 50 Hz for 3 minutes for 10 minutes;

(3) adding the mixture in step (2) on a mould plate and spraying composite pigment powder;

(4) putting the product obtained in step (3) into a pressing machine, vacuumizing, vibrating and forming at eight frequency bands in sequence: 40 seconds at 20 Hz, 30 seconds at 30 Hz, 30 seconds at 35 Hz, 30 seconds at 40 Hz, 60 seconds at 45 Hz, 30 seconds at 50 Hz, and then putting the pressed plate into curing oven and flatwise sizing for 24 hours after 90° C. curing for 100 minutes;

(5) after keeping thickness by putting the abovementioned embryonic plate into polishing machine and fine polishing by 26-6000 mesh abrasion block, the environment-friendly artificial stone with low cost and high strength is obtained.

The raw materials and steps remain the same to prepare a conventional artificial quartz sand composite plate, except that using 26-70 mesh quartz sand instead of the fritted sand.

The obtained environment-friendly artificial stone with low cost and high strength and conventional artificial quartz sand composite plate are tested for mechanics performance, wherein three test results of the flexural strength of the conventional artificial quartz sand composite plate are 60.3 MPa, 60.5 MPa and 60.6 MPa respectively, and the average value was 60.5 MPa; three test results of the flexural strength test of the new artificial stone with high performance and low cost synthesized by the environment-friendly materials are 104 MPa, 103 MPa and 106 MPa respectively, and the average value was 104 MPa, which is improved about 72% comparing with the flexural strength of the conventional artificial quartz sand composite plate; In addition, three falling ball impact strength tests are carried out on the new artificial stone with high performance and low cost synthesized by the environment-friendly materials, and the results are 133 cm, 135 cm, and 134 cm respectively, and the average value was 134 cm.

The above embodiments are the better embodiments of the invention, however, embodiments of the invention are not limited thereto, and any other changes, modifications, replacements, combinations and simplifications made without departing from the spirit and principle of the invention, should be covered in the protection scope of the invention.

What is claimed is:

1. An environment-friendly artificial stone with low cost and high strength, comprising the following raw materials in parts by mass:

| | |
|---|---|
| fritted sand | 60-80 parts |
| quartz powder | 10-30 parts |
| terephthalic unsaturated polyester resin | 9-14 parts |
| curing agent | 0.6-1 parts |
| coupling agent | 0.8-1 parts |
| pigment paste | 0.5-1 parts |
| pigment powder | 0.1-1 parts; | wherein, the flitted sand comprises the following components as mass percent:

| | |
|---|---|
| $Al_2O_3$ | 1-10% |
| $SiO_2$ | 60-80% |
| $Fe_2O_3$ | 0.1-0.5% |
| CaO | 5-10% |
| MgO | 2-5% |
| $K_2O$ | 0.2-2% |
| $Na_2O$ | 5-15% |
| $TiO_2$ | 0.1-2%. |

2. The environment-friendly artificial stone with low cost and high strength of claim 1, wherein a flexural strength of environment-friendly artificial stone with low cost and high strength is 80-115 Mpa.

3. The environment-friendly artificial stone with low cost and high strength of claim 1, wherein the fritted sand comprises the fritted sand of 8-16 mesh, 16-26 mesh, 26-40 mesh, 40-70 mesh, 70-120 mesh and/or 120-200 mesh.

4. The environment-friendly artificial stone with low cost and high strength of claim 1, wherein the fritted sand is obtained by melting tailing quartz, coal gangue, limestone, sodium feldspar and potassium feldspar in a mass ratio of 7-10:4-6:1-2:1-3:1-3 at a high temperature of 1200° C.-1400° C., and then quenching in chilled water.

5. The environment-friendly artificial stone with low cost and high strength of claim 1, wherein mesh range of the quartz powder is 300-1000 mesh.

* * * * *